United States Patent
Wei

(10) Patent No.: US 7,332,895 B2
(45) Date of Patent: Feb. 19, 2008

(54) REGULATOR FOR ELIMINATING NOISES GENERATED BY AUTOMOTIVE POWER GENERATOR

(75) Inventor: Chen-Ku Wei, Nantou County (TW)

(73) Assignee: Mobiletron Electronics, Co., Taichung Hsien (TW)

( * ) Notice: Subject to any disclaimer, the term of this patent is extended or adjusted under 35 U.S.C. 154(b) by 102 days.

(21) Appl. No.: 11/332,349

(22) Filed: Jan. 17, 2006

(65) Prior Publication Data

US 2007/0164712 A1    Jul. 19, 2007

(51) Int. Cl.
   *H02P 9/00*   (2006.01)
   *H02P 9/10*   (2006.01)
   *H02P 11/00*  (2006.01)
(52) U.S. Cl. .............................. 322/44; 322/28; 322/59
(58) Field of Classification Search ................... 322/28, 322/26, 24, 44, 59
   See application file for complete search history.

(56) References Cited

U.S. PATENT DOCUMENTS

| | | | |
|---|---|---|---|
| 4,128,799 A * | 12/1978 | Morishima ................... | 322/28 |
| 4,486,801 A * | 12/1984 | Jackovich et al. ............ | 361/21 |
| 5,744,941 A * | 4/1998 | Bartol et al. ................. | 322/28 |
| 6,707,275 B2 * | 3/2004 | Okahara et al. .............. | 322/24 |
| 6,812,675 B2 * | 11/2004 | Okamoto et al. ............. | 322/28 |
| 6,867,569 B2 * | 3/2005 | Taniguchi et al. ............ | 322/28 |
| 6,943,532 B1 * | 9/2005 | Kouwa et al. ................ | 322/28 |
| 7,034,508 B1 * | 4/2006 | Sasaki et al. ................. | 322/28 |
| 7,245,112 B2 * | 7/2007 | Velhner et al. ............... | 322/59 |
| 2006/0181249 A1 * | 8/2006 | Velhner et al. ............... | 322/59 |

* cited by examiner

*Primary Examiner*—Julio C. Gonzalez
(74) *Attorney, Agent, or Firm*—Bacon & Thomas, PLLC

(57) ABSTRACT

A regulator for eliminating noises generated by an automotive power generator is composed of a front-end circuit, a semiconductor power element, a resistor, and a capacitor. The front-end circuit includes a plurality of electronic components for offering control signals generated therefrom. The semiconductor power element is electrically connected with a field coil of the power generator, including a gate electrically connected with the front-end circuit for receiving the control signals that switch ON/OFF the gate. The resistor is electrically connected in series between the gate and the front-end circuit. The capacitor includes an end connected with the gate and the other end thereof grounded. Thus, the semiconductor power element can slow down the ON/OFF switching to be further low-cost and simple-circuit for enhanced quality of the output voltage of the power generator.

6 Claims, 8 Drawing Sheets

REGULATOR FOR ELIMINATING NOISES GENERATED BY AUTOMOTIVE POWER GENERATOR

BACKGROUND OF THE INVENTION

1. Field of the Invention

The present invention relates generally to automotive power generators, and more particularly, to a regulator for eliminating noises generated by an automotive power generator.

2. Description of the Related Art

Because people's requirement for the car has evolved from basic transportation to comfortableness, safety, gasoline-saving, and environmental protection, electronic apparatuses mounted on the car become more and more precise and diversified. Relatively, more electronic apparatuses require greater power source. Thus, the power generator of the car equipped with those electronic apparatuses must focus on power enhancement and stability of power source.

In view of above, the power generator that is the primary element of the automotive power generating system must be designed different from the conventional one, while the kinetic energy is transformed into the electric energy, to attain the power enhancement and stability of the power source.

FIG. 6 shows a conventional voltage regulator. When a voltage Vb at a point B runs beyond a predetermined value, a Zener diode ZD1 collapses to enable conductance of a transistor Q1 and to further deactivate a semiconductor power element PTR. Thus, the current fails to flow through a field coil 79 of the power generator so that none of any magnetic field will be generated and the power generator will not generate any electric energy. On the contrary, when the voltage Vb is lower than the predetermined value, the Zener diode ZD1 will not collapse to deactivate the transistor Q1 and to enable conductance of the semiconductor power element PTR, thus enabling the power generator to generate the electric energy.

It is necessary to amplify the magnetic field for greater power output of the power generator. To amplify the magnetic field, it is also necessary to amplify the current of the field coil, and meanwhile, the semiconductor power element PTR has to endure greater current. However, the semiconductor power element PTR is composed of a Bipolar Darlington power transistor. While the field current runs beyond 5 Amperes, the Bipolar Darlington power transistor is not applicable to higher voltage drop but the metal-oxide-semiconductor field effect transistor (MOSFET) is much adapted to bear or boost heavy current.

While the MOSFET is applied to the semiconductor power element, the MOSFET is characterized by rapid voltage drop/rise during its ON/OFF switching. FIG. 7 shows a waveform comparative diagram of the voltage of a point F, i.e. a field coil, and the voltage Vb of the point B+ in a circuitry of a conventional voltage regulator. FIG. 8 shows a comparative diagram of the waveform of the point F, i.e. a field coil, and the noise waveform of the point B+ in a circuitry of a conventional voltage regulator. As indicated in FIGS. 7 and 8, , the ON/OFF switching of the semiconductor power element enables rapid voltage drop/rise, illustrating almost a plummeting/rocketing line. Thus, the MOSFET will generate greater counter electromotive force according to the formula, $V=-L\times(dI/dt)$, while applied to the voltage regulator for controlling ON/OFF of the field coil, and then the counter electromotive force will be transferred to the voltage Vb to incur more and greater power noises in the car and to cause worse quality of power supply to adversely affect the operations of electrical appliances mounted to the car. In addition, the voltage regulator itself tends to incur erroneous voltage detection because of unstable voltage Vb, such that the power generator generates super drop and rise of the output voltage.

SUMMARY OF THE INVENTION

The primary objective of the present invention is to provide a regulator for eliminating noises generated by an automotive power generator, wherein the regulator is low-cost and simple-circuit for enhanced quality of the output voltage of the power generator.

The foregoing objective of the present invention is attained by the regulator, which is composed of a front-end circuit, a semiconductor power element, a resistor, and a capacitor. The front-end circuit includes a plurality of electronic components for offering control signals generated therefrom. The semiconductor power element is electrically connected with a field coil of the power generator, including a gate electrically connected with the front-end circuit for receiving the control signals that switch ON/OFF the gate. The resistor is electrically connected in series between the gate and the front-end circuit. The capacitor includes an end connected with the gate and the other end thereof grounded. Thus, the semiconductor power element can slow down the ON/OFF switching to be further low-cost and simple-circuit for enhanced quality of the output voltage of the power generator.

DETAILED DESCRIPTION OF PREFERRED EMBODIMENTS

Figure 1:
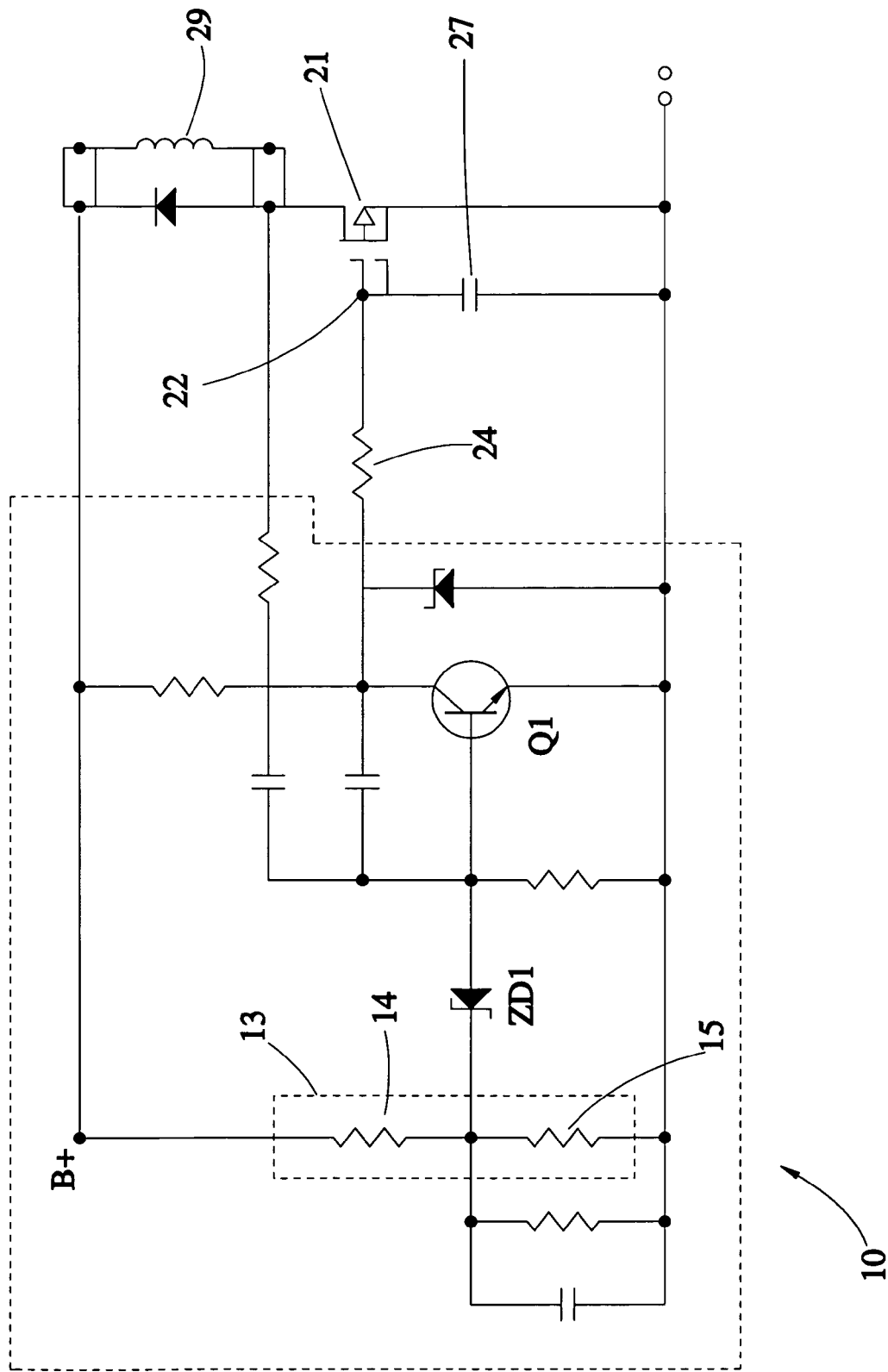
FIG. 1 is a circuitry of a preferred embodiment of the present invention.

Referring to FIG. 1, a regulator 10 for eliminating noises generated by an automotive power generator (not shown), constructed according to a preferred embodiment of the present invention, includes a front-end circuit 11, a semiconductor power element 21, a resistor 24, and a capacitor 27. The automotive power generator includes a field coil 29.

The front-end circuit 11 is composed of a plurality of electronic components for offering control signals generated therefrom. The electronic components include a voltage-dividing module 13 and a Zener diode ZD1. The voltage-dividing module 13 has two resistors 14 and 15 combined in series with each other. The Zener diode ZD1 is connected in series between the voltage-dividing module 13 and a transistor Q1.

The semiconductor power element 21 is connected the field coil 29 of the automotive power generator (not shown), being a P-typed MOSFET in this embodiment, which has a gate 22 connected with the front-end circuit 11 for receiving the control signals from the front-end circuit 11, being controlled by the control signals to switch ON/OFF.

The resistor 24 is connected in series between the gate 22 and the front-end circuit 11.

The capacitor 27 has an end connected with the gate 22 and the other end thereof grounded.

During the operation of the regulator 10 of the present invention, while a partial voltage of the voltage-dividing module 13 is greater than a breakdown voltage of the Zener diode ZD1, the transistor Q1 is switched from OFF to ON. In the meantime, the voltage of the gate 22 drops along with the resistive-capacitive (RC) constant discharging slope of the capacitor 27. While the semiconductor power element 21 is switched from ON to OFF, the ON/OFF switching of the semiconductor power element 21 becomes slow to further slow down the variation of the field current, thus eliminating the noises.

Figure 2:
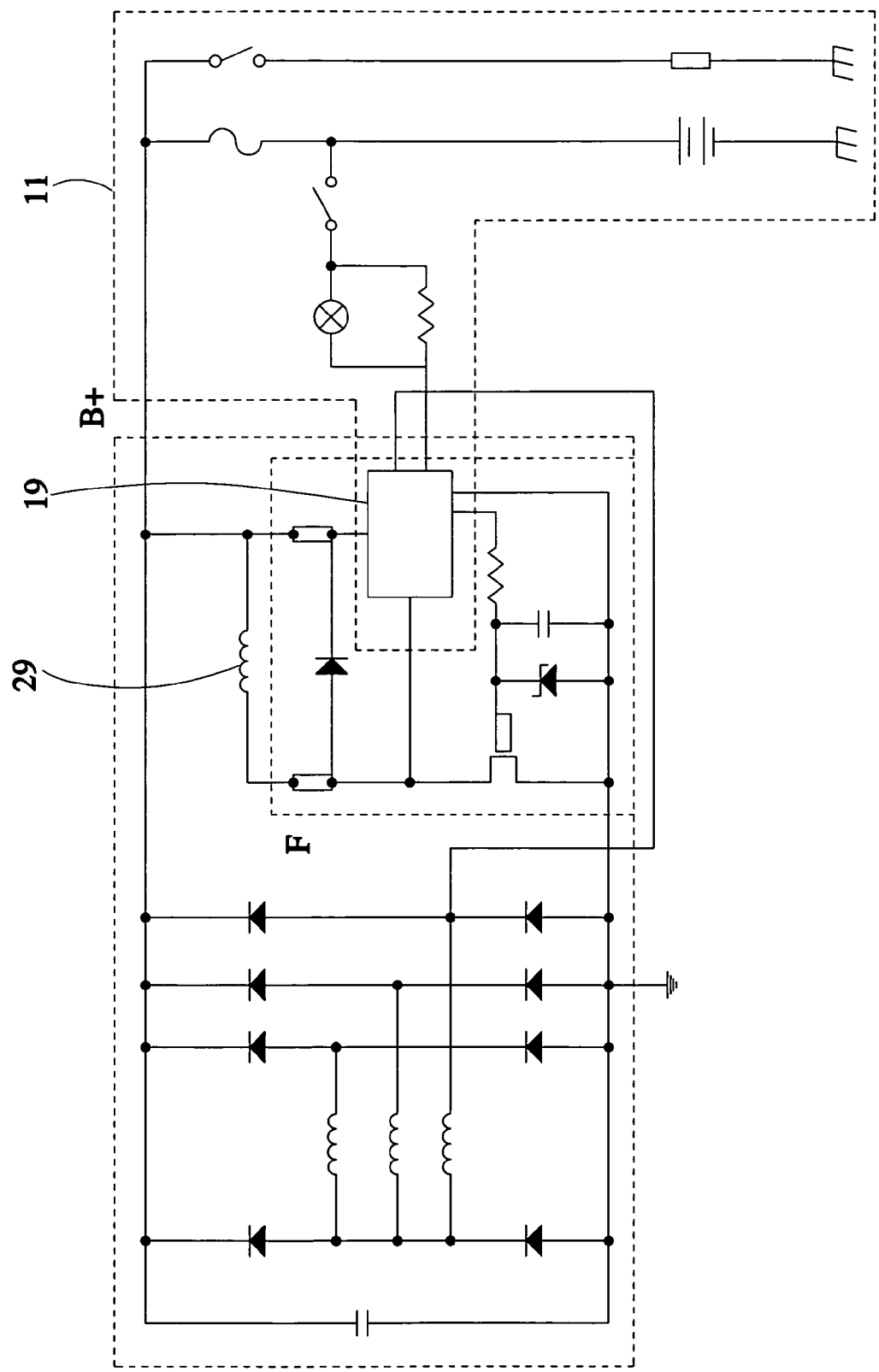
FIG. 2 is another circuitry of the preferred embodiment of the present invention.

Referring to FIG. 2, the front-end circuit 11 alternatively further includes a microprocessor 19 for more complex calculation and control and more comprehensive applications for power generation of the power generator (not shown).

Figure 3:
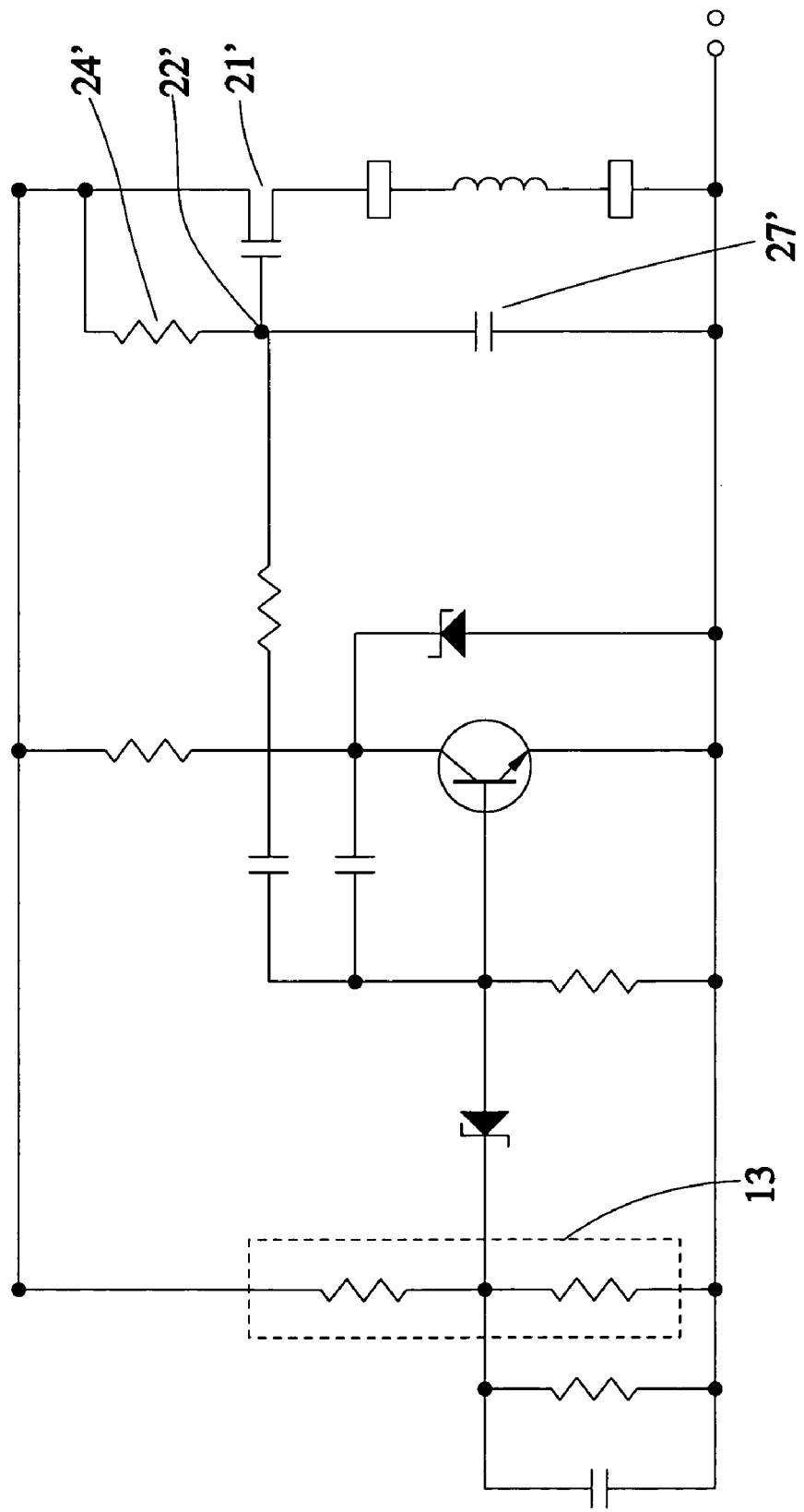
FIG. 3 is another circuitry of the preferred embodiment of the present invention.

In addition, the semiconductor power element 21' can alternatively be N-typed MOSFET, which circuitry is shown as FIG. 3. The voltage of the gate 22' of the semiconductor power element 21' also drops along with an RC constant discharging slope of the capacitor 27', and the ON/OFF switching of the semiconductor power element 21' becomes slow to further slow down the variation of the field current, thus eliminating the noises.

Figure 4:
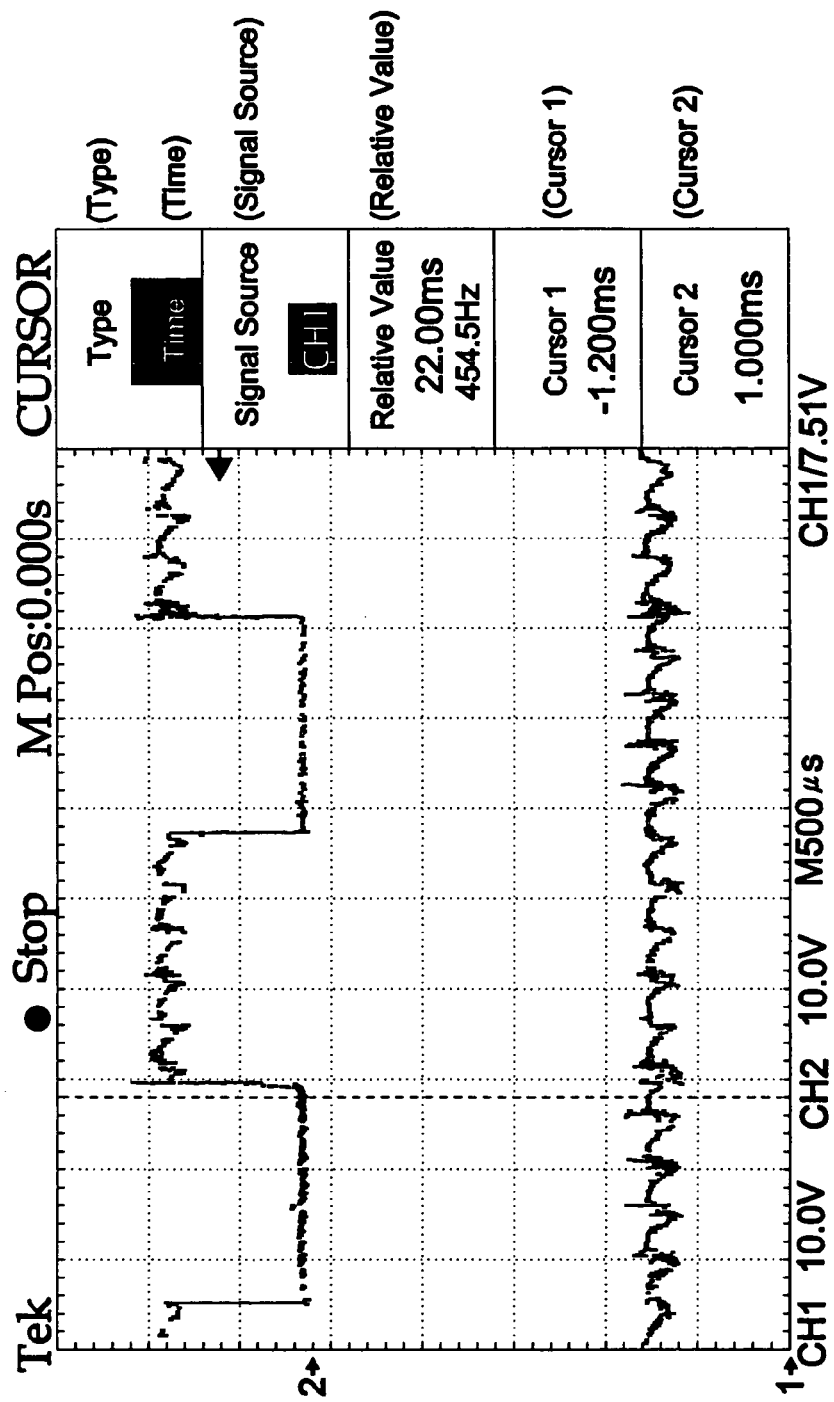
FIG. 4 is a waveform schematic view of the preferred embodiment of the present invention, showing comparison between a voltage at a point F and a voltage Vb at a point B+.

FIG. 4 is a waveform schematic view of the preferred embodiment of the present invention, showing comparison between a voltage at a point F (field coil 29) and a voltage Vb at a point B+ in the circuitry of FIG. 1.

Figure 5:
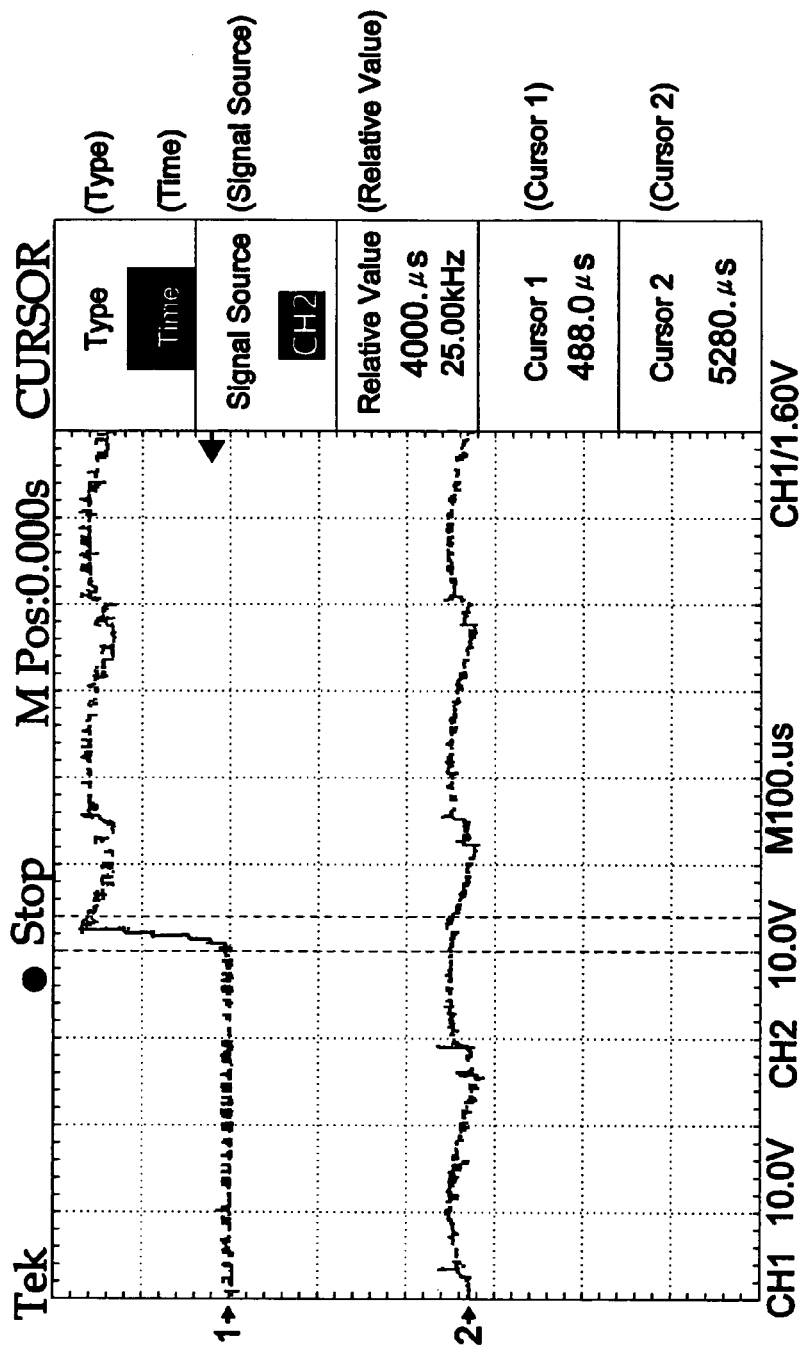
FIG. 5 is another waveform schematic view of the preferred embodiment of the present invention, showing comparison between a waveform at the point F and a noise waveform at the point B+.
Figure 6:
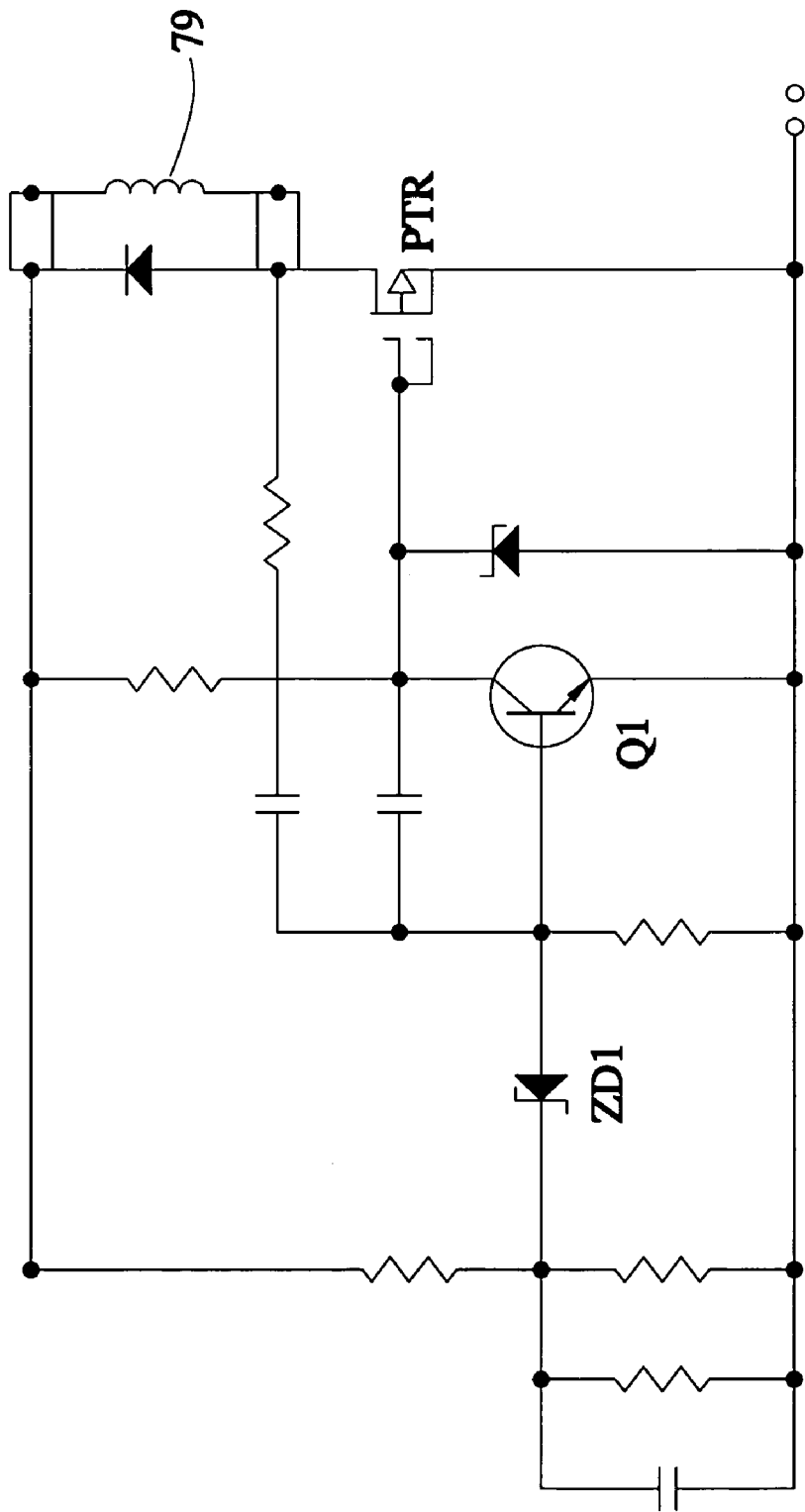
FIG. 6 is a circuitry of a conventional voltage regulator.
Figure 7:
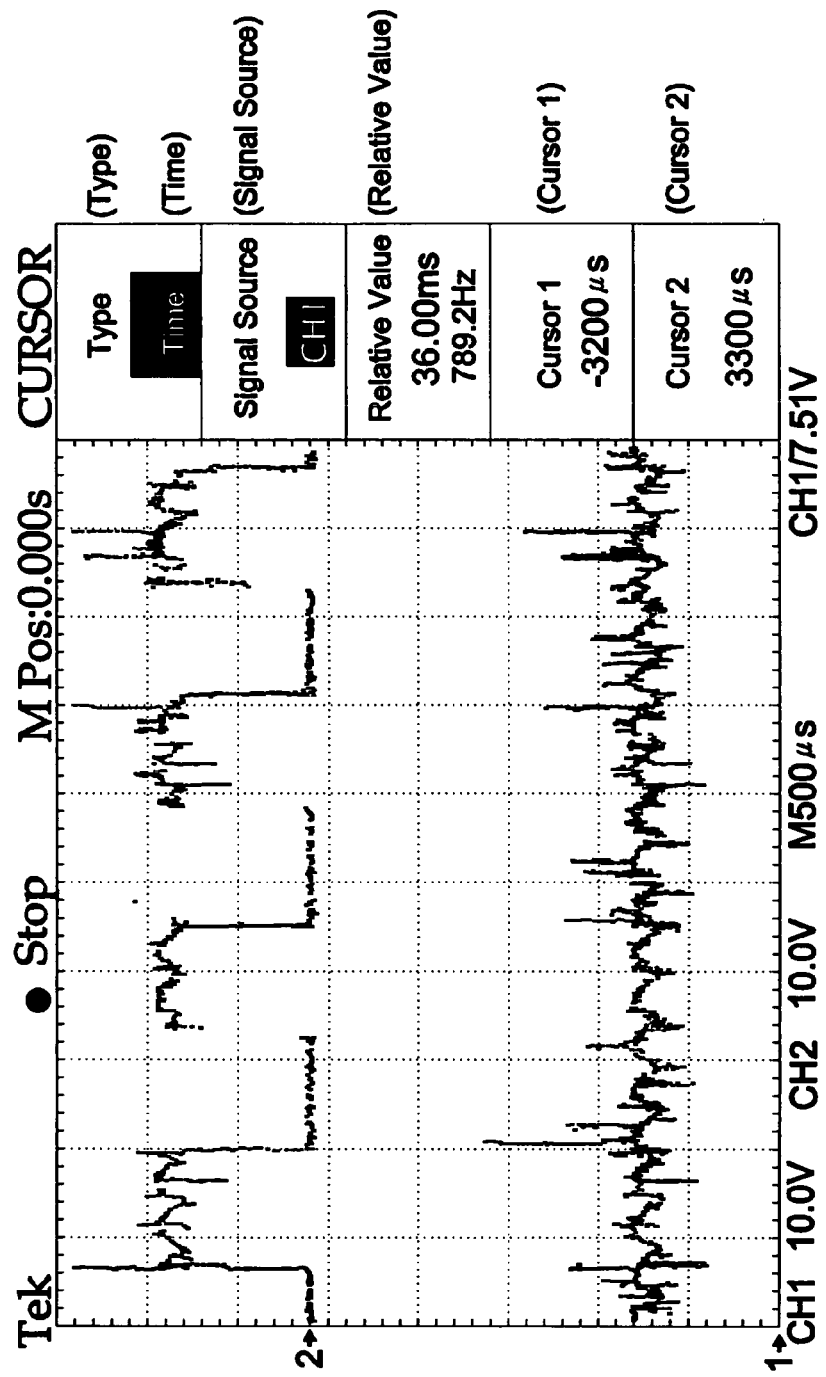
FIG. 7 is a waveform schematic view of the conventional voltage regulator, showing comparison between a voltage at a point F and a voltage Vb at a point B+.
Figure 8:
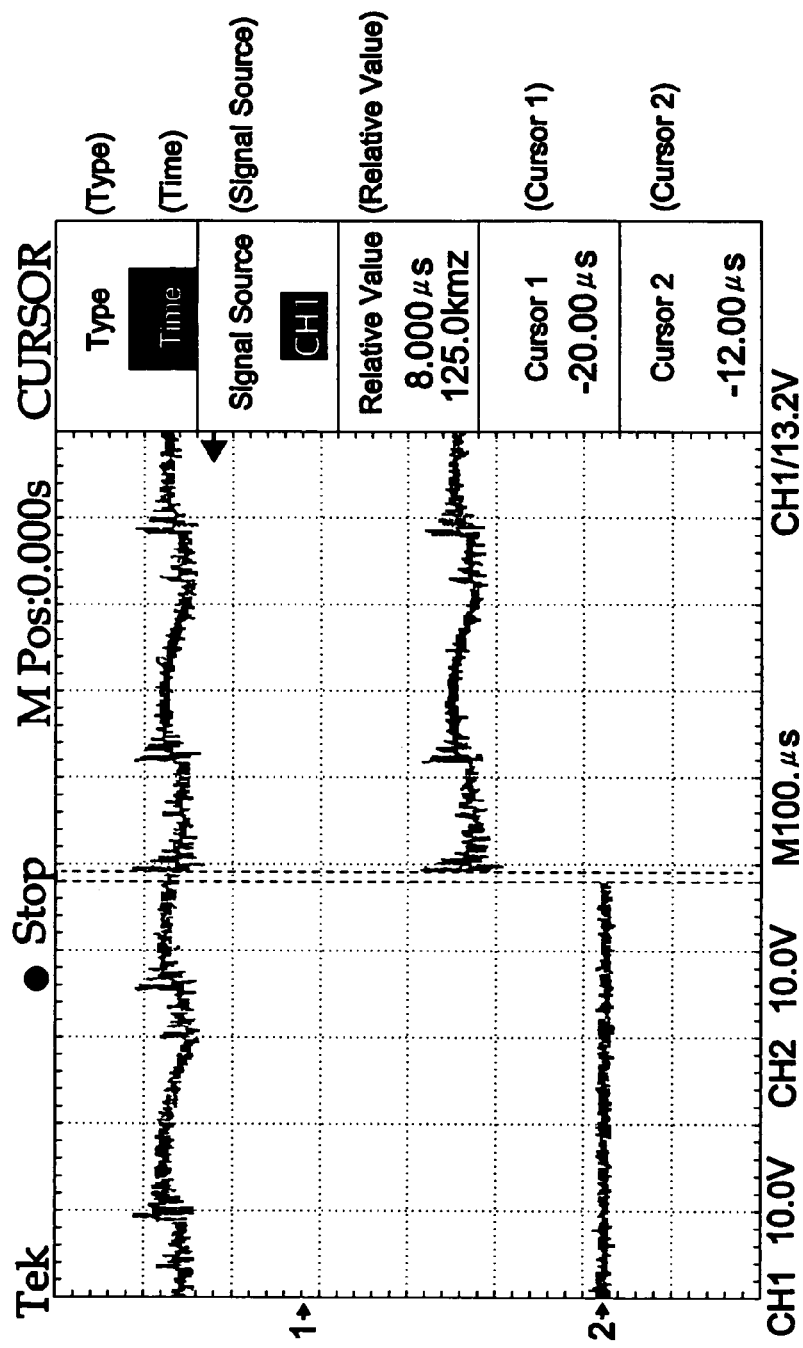
FIG. 8 is another waveform schematic view of the conventional voltage regulator, showing comparison between a waveform at the point F and a noise waveform at the point B+.

FIG. 5 is another waveform schematic view of the preferred embodiment of the present invention, showing comparison between a waveform at the point F (field coil 29) and a noise waveform at the point B+.

As indicated above, the present invention employs the resistor and the capacitor, which are simple electronic components, to slow down the ON/OFF switching of the semiconductor power element. In other words, the components of the present invention are low-cost and simple-circuit for enhanced quality of the output voltage of the power generator.

What is claimed is:

1. A regulator for eliminating noises generated by an automotive power generator, said power generator having a field coil, comprising:

a front-end circuit having a plurality of electronic components for generating control signals;

a semiconductor power element connected with said field coil of said power generator, said semiconductor power element having a gate connected with said front-end circuit for receiving control signals generated by said front-end circuit, said control signals controlling said semiconductor power element to switch ON/OFF;

a resistor connected in series between said gate and said front-end circuit; and a capacitor having an end connected with said gate and the other end thereof grounded.

2. The regulator as defined in claim 1, wherein said semiconductor power element is a metal-oxide-semiconductor field effect transistor (MOSFET).

3. The regulator as defined in claim 2, wherein said semiconductor power element is a P-typed MOSFET.

4. The regulator as defined in claim 2, wherein said semiconductor power element is an N-typed MOSFET.

5. The regulator as defined in claim 2, wherein said front-end circuit comprises a voltage-dividing module composed of two resistors, said resistors being connected in series with each other.

6. The regulator as defined in claim 5, wherein said front-end circuit further comprises a microprocessor.

* * * * *